US012430959B2

(12) United States Patent
Chen et al.

(10) Patent No.: US 12,430,959 B2
(45) Date of Patent: Sep. 30, 2025

(54) SYSTEM AND METHOD OF INTEGRATING TRAFFIC ACCIDENT ASSISTANCE IDENTIFICATION AND SAFETY OF INTENDED FUNCTIONALITY SCENE ESTABLISHMENT

(71) Applicant: Automotive Research & Testing Center, Changhua County (TW)

(72) Inventors: Chien-An Chen, Changhua County (TW); Chih-Wei Chuang, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 476 days.

(21) Appl. No.: 18/059,435

(22) Filed: Nov. 29, 2022

(65) Prior Publication Data

US 2024/0177537 A1 May 30, 2024

(51) Int. Cl.

*G07C 5/08* (2006.01)
*G07C 5/00* (2006.01)
*G08G 1/01* (2006.01)

(52) U.S. Cl.

CPC ........... *G07C 5/0808* (2013.01); *G07C 5/008* (2013.01); *G08G 1/0112* (2013.01); *G08G 1/0116* (2013.01)

(58) Field of Classification Search

None

See application file for complete search history.

(56) References Cited

U.S. PATENT DOCUMENTS 9,111,316 B2 * 8/2015 Fernandes .............. G06Q 40/08
9,201,842 B2 * 12/2015 Plante ...................... B60R 11/04
9,226,004 B1 * 12/2015 Plante ..................... H04N 7/183
9,344,683 B1 * 5/2016 Nemat-Nasser ........ B60R 11/04
9,780,967 B2 * 10/2017 Sargent .................. G07C 5/008
10,007,263 B1 * 6/2018 Fields ................... B60W 30/09
10,486,709 B1 * 11/2019 Mezaael ............... B60W 40/09
10,540,833 B1 * 1/2020 Gingrich ................ G06Q 40/08
10,719,886 B1 * 7/2020 Konrardy ............. G07C 5/0808
10,953,889 B2 * 3/2021 Fuentes .................. G07C 5/008
10,984,275 B1 * 4/2021 Campbell ........ H04N 21/42202
11,250,054 B1 * 2/2022 Campbell .............. G06V 20/62
11,257,308 B2 * 2/2022 Ramic ...................... G06F 3/167

(Continued)

*Primary Examiner* — Jonathan M Dager

(74) *Attorney, Agent, or Firm* — CKC & Partners Co., LLC

(57) ABSTRACT

A method of integrating a traffic accident assistance identification and a safety of the intended functionality (SOTIF) scene establishment is applied to a vehicle and includes collecting an on-board diagnostic data, a digital video data and a control data from an on-board diagnostic device, a digital video recorder and a controller; analyzing the on-board diagnostic data, the digital video data and the control data to generate an accident record message and an action confirmation message, and the accident record message includes a vehicle behavior message and a driving intention message; automatically generating an accident assistance identifying data according to the vehicle behavior message, the driving intention message and the action confirmation message, and the accident assistance identifying data includes an accident scene picture and a behavioral characteristic report; and establishing an accident scene database according to the action confirmation message. The accident scene database includes a SOTIF scene.

16 Claims, 8 Drawing Sheets

(56) References Cited

U.S. PATENT DOCUMENTS

| | | | | |
|---|---|---|---|---|
| 11,734,968 | B2 * | 8/2023 | Ramic | G07C 5/0808 701/31.4 |
| 11,783,851 | B2 * | 10/2023 | Schneider | G06N 3/045 701/111 |
| 12,198,198 | B2 * | 1/2025 | Lee | G06V 20/59 |
| 2004/0088090 | A1 * | 5/2004 | Wee | G08G 1/205 701/33.4 |
| 2006/0212195 | A1 * | 9/2006 | Veith | G06Q 10/06 701/33.4 |
| 2007/0136078 | A1 * | 6/2007 | Plante | G07C 5/085 348/148 |
| 2007/0257815 | A1 * | 11/2007 | Gunderson | G08G 1/16 340/903 |
| 2010/0238009 | A1 * | 9/2010 | Cook | G07C 5/00 340/439 |
| 2013/0274950 | A1 * | 10/2013 | Richardson | G08G 1/0112 701/1 |
| 2013/0345927 | A1 * | 12/2013 | Cook | G07C 5/0808 701/33.4 |
| 2014/0358394 | A1 * | 12/2014 | Picciotti | G06F 21/552 701/1 |
| 2016/0112216 | A1 * | 4/2016 | Sargent | G07C 5/008 370/328 |
| 2017/0174222 | A1 * | 6/2017 | Fuentes | B60W 50/04 |
| 2018/0225894 | A1 * | 8/2018 | Mays | G07C 5/008 |
| 2018/0345981 | A1 * | 12/2018 | Ferguson | G07C 5/02 |
| 2019/0039545 | A1 * | 2/2019 | Kumar | G07C 5/008 |
| 2019/0042900 | A1 * | 2/2019 | Smith | G06V 10/96 |
| 2019/0248375 | A1 * | 8/2019 | Fuentes | B60W 40/09 |
| 2020/0374345 | A1 * | 11/2020 | Yerli | H04L 67/131 |
| 2021/0152869 | A1 * | 5/2021 | Chiu | G08G 1/017 |
| 2021/0206381 | A1 * | 7/2021 | Fuentes | B60W 40/09 |
| 2024/0161608 | A1 * | 5/2024 | Lee | G08G 1/0133 |
| 2024/0174262 | A1 * | 5/2024 | Chen | B60W 60/0018 |
| 2024/0278799 | A1 * | 8/2024 | B Venkataraman | B60W 60/00 |
| 2025/0166434 | A1 * | 5/2025 | Wu | G06Q 40/08 |
| 2025/0171039 | A1 * | 5/2025 | Chuang | G06F 30/20 |

* cited by examiner

SYSTEM AND METHOD OF INTEGRATING TRAFFIC ACCIDENT ASSISTANCE IDENTIFICATION AND SAFETY OF INTENDED FUNCTIONALITY SCENE ESTABLISHMENT

BACKGROUND

Technical Field

The present disclosure relates to a system and a method of integrating an accident assistance identification and a scene establishment. More particularly, the present disclosure relates to a system and a method of integrating a traffic accident assistance identification and a safety of the intended functionality (SOTIF) scene establishment.

Description of Related Art

In the identification of current road traffic accident cause, the mode of the identification is usually to record the accident data to perform accident judgment by the police, and utilize a driving recorder for assisting. The police verify the accident history via large and complex data (e.g., transcripts, conditions of road, conditions of vehicle body, human injuries, marks on road surface, surveillance video, the driving recorder, etc.), so that there are time-consuming production of manual appraisal reports, high labor cost and easy concealment in the current accident. In addition, the number of autonomous vehicles is increasing, but there are limitations in system functions of the autonomous vehicles, so that behaviors of the autonomous vehicles in some cases are different from initial expectations, and the main cause of the accident cannot be clarified after the accident occurs. Therefore, a system and a method of integrating a traffic accident assistance identification and a safety of the intended functionality scene establishment which are capable of automatically generating the accident assistance identifying data effectively and quickly, reducing the labor cost and clarifying the main cause of the accident are commercially desirable.

SUMMARY

According to one aspect of the present disclosure, a system of integrating a traffic accident assistance identification and a safety of an intended functionality scene establishment is applied to a vehicle. The system of integrating the traffic accident assistance identification and the safety of the intended functionality (SOTIF) scene establishment includes an on-board diagnostic (OBD) device, a digital video recorder (DVR), a controller and a cloud computing processing unit. The on-board diagnostic device is disposed on the vehicle and captures an on-board diagnostic data. The digital video recorder is disposed on the vehicle and captures a digital video data. The controller is disposed on the vehicle and generates a control data. The cloud computing processing unit is signally connected to the on-board diagnostic device, the digital video recorder and the controller. The cloud computing processing unit is configured to perform an accident data collecting step, a data analyzing step, an identifying data automatically generating step and a scene database establishing step. The accident data collecting step includes configuring the cloud computing processing unit to collect the on-board diagnostic data, the digital video data and the control data from the on-board diagnostic device, the digital video recorder and the controller. The data analyzing step includes configuring the cloud computing processing unit to analyze the on-board diagnostic data, the digital video data and the control data to generate an accident record message and an action confirmation message, and the accident record message includes a vehicle behavior message and a driving intention message. The identifying data automatically generating step includes configuring the cloud computing processing unit to automatically generate an accident assistance identifying data according to the vehicle behavior message, the driving intention message and the action confirmation message, and the accident assistance identifying data includes an accident scene picture and a behavioral characteristic report. The scene database establishing step includes configuring the cloud computing processing unit to establish an accident scene database according to the action confirmation message. The accident scene database includes a SOTIF scene.

According to another aspect of the present disclosure, a method of integrating a traffic accident assistance identification and a safety of an intended functionality scene establishment is applied to a vehicle. The method of integrating the traffic accident assistance identification and the safety of the intended functionality (SOTIF) scene establishment includes performing an accident data collecting step, a data analyzing step, an identifying data automatically generating step and a scene database establishing step. The accident data collecting step includes configuring a cloud computing processing unit to collect an on-board diagnostic data, a digital video data and a control data from an on-board diagnostic (OBD) device, a digital video recorder (DVR) and a controller. The data analyzing step includes configuring the cloud computing processing unit to analyze the on-board diagnostic data, the digital video data and the control data to generate an accident record message and an action confirmation message, and the accident record message includes a vehicle behavior message and a driving intention message. The identifying data automatically generating step includes configuring the cloud computing processing unit to automatically generate an accident assistance identifying data according to the vehicle behavior message, the driving intention message and the action confirmation message, and the accident assistance identifying data includes an accident scene picture and a behavioral characteristic report. The scene database establishing step includes configuring the cloud computing processing unit to establish an accident scene database according to the action confirmation message. The accident scene database includes a SOTIF scene.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
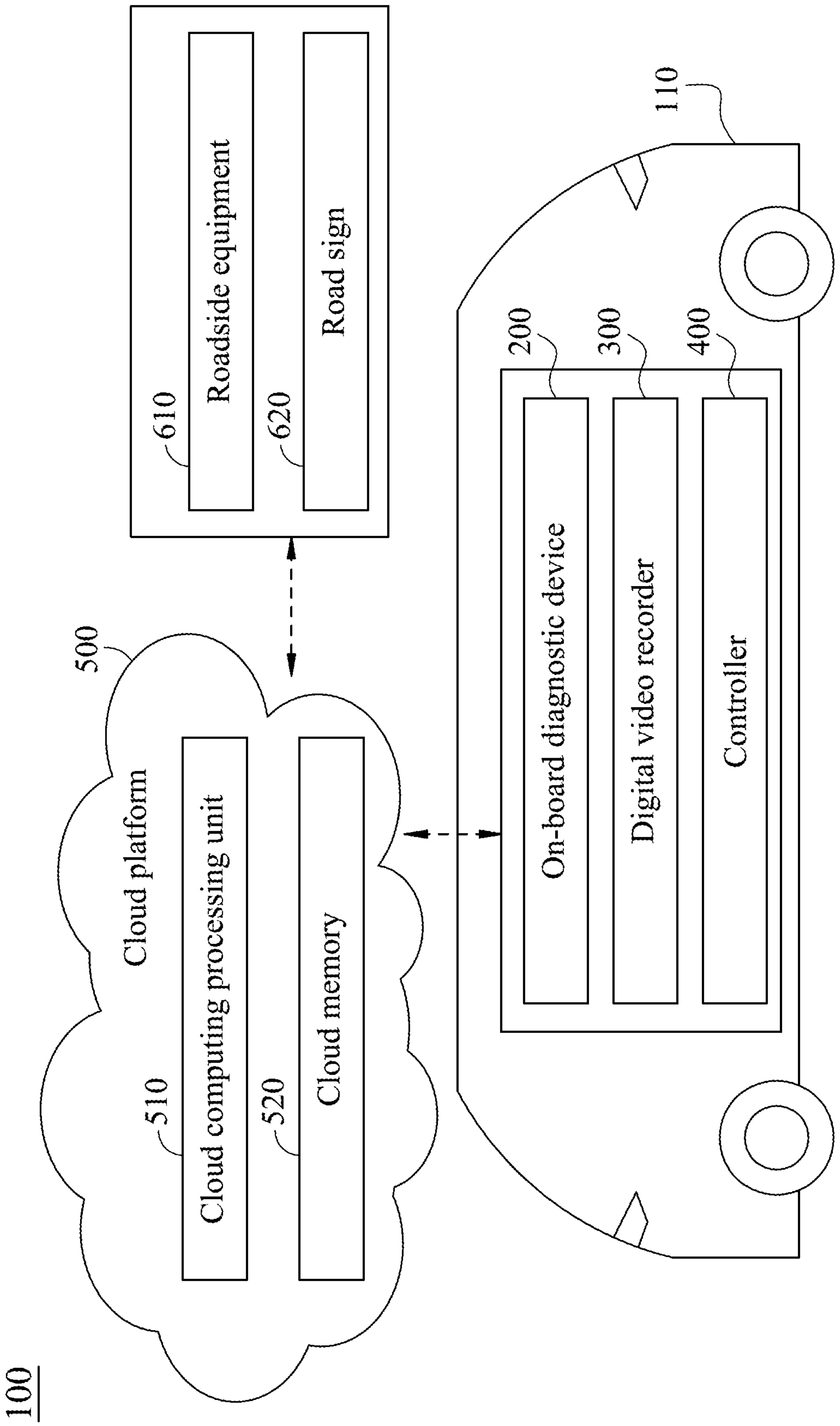
FIG. 1 shows a schematic view of a system of integrating a traffic accident assistance identification and a safety of the intended functionality (SOTIF) scene establishment according to a first embodiment of the present disclosure.

Reference is made to FIG. 1. FIG. 1 shows a schematic view of a system 100 of integrating a traffic accident assistance identification and a safety of the intended functionality (SOTIF) scene establishment according to a first embodiment of the present disclosure. The system 100 of integrating the traffic accident assistance identification and the SOTIF scene establishment is applied to a vehicle 110 and includes an on-board diagnostic (OBD) device 200, a digital video recorder (DVR) 300, a controller 400 and a cloud platform 500. The on-board diagnostic device 200 is disposed on the vehicle 110 and captures an on-board diagnostic data. The digital video recorder 300 is disposed on the vehicle 110 and captures a digital video data. The controller 400 is disposed on the vehicle 110 and generates a control data. The cloud platform 500 includes a cloud computing processing unit 510 and a cloud memory 520. The cloud computing processing unit 510 is signally connected to the on-board diagnostic device 200, the digital video recorder 300 and the controller 400. First, the cloud computing processing unit 510 is configured to collect the on-board diagnostic data, the digital video data and the control data from the on-board diagnostic device 200, the digital video recorder 300 and the controller 400. Next, the cloud computing processing unit 510 is configured to analyze the on-board diagnostic data, the digital video data and the control data to generate an accident record message and an action confirmation message, and the accident record message includes a vehicle behavior message and a driving intention message. Next, the cloud computing processing unit 510 is configured to automatically generate an accident assistance identifying data according to the vehicle behavior message, the driving intention message and the action confirmation message, and the accident assistance identifying data includes an accident scene picture and a behavioral characteristic report. In addition, the cloud computing processing unit 510 is configured to establish an accident scene database according to the action confirmation message. The accident scene database includes a SOTIF scene. The cloud memory 520 is signally connected to the cloud computing processing unit 510 and is configured to access the on-board diagnostic data, the digital video data, the control data, the accident record message, the action confirmation message and the accident assistance identifying data.

In one embodiment (refer to FIG. 6), the system 100 of integrating the traffic accident assistance identification and the SOTIF scene establishment may further include a roadside equipment 610 and a road sign 620. The roadside equipment 610 is signally connected to the cloud computing processing unit 510. The roadside equipment 610 is disposed on a road and detects the road to generate an external data 612. The roadside equipment 610 transmits the external data 612 to the cloud computing processing unit 510. The road sign 620 is signally connected to the cloud computing processing unit 510. The road sign 620 is disposed on the road and generates a sign signal 622. The road sign 620 transmits the sign signal 622 to the cloud computing processing unit 510. The external data 612 includes a map message 612*a*, and the behavioral characteristic report 516*b* includes the external data 612 and the sign signal 622.

The cloud computing processing unit 510 may be a processor, a microprocessor, an electronic control unit (ECU), a computer, a mobile device processor or another computing processor, but the present disclosure is not limited thereto. The cloud computing processing unit 510 can perform a method of integrating the traffic accident assistance identification and the SOTIF scene establishment. Moreover, the cloud memory 520 may be a random access memory (RAM) or another type of dynamic storage device that stores information, messages and instructions for execution by the cloud computing processing unit 510, but the present disclosure is not limited thereto.

Figure 2:
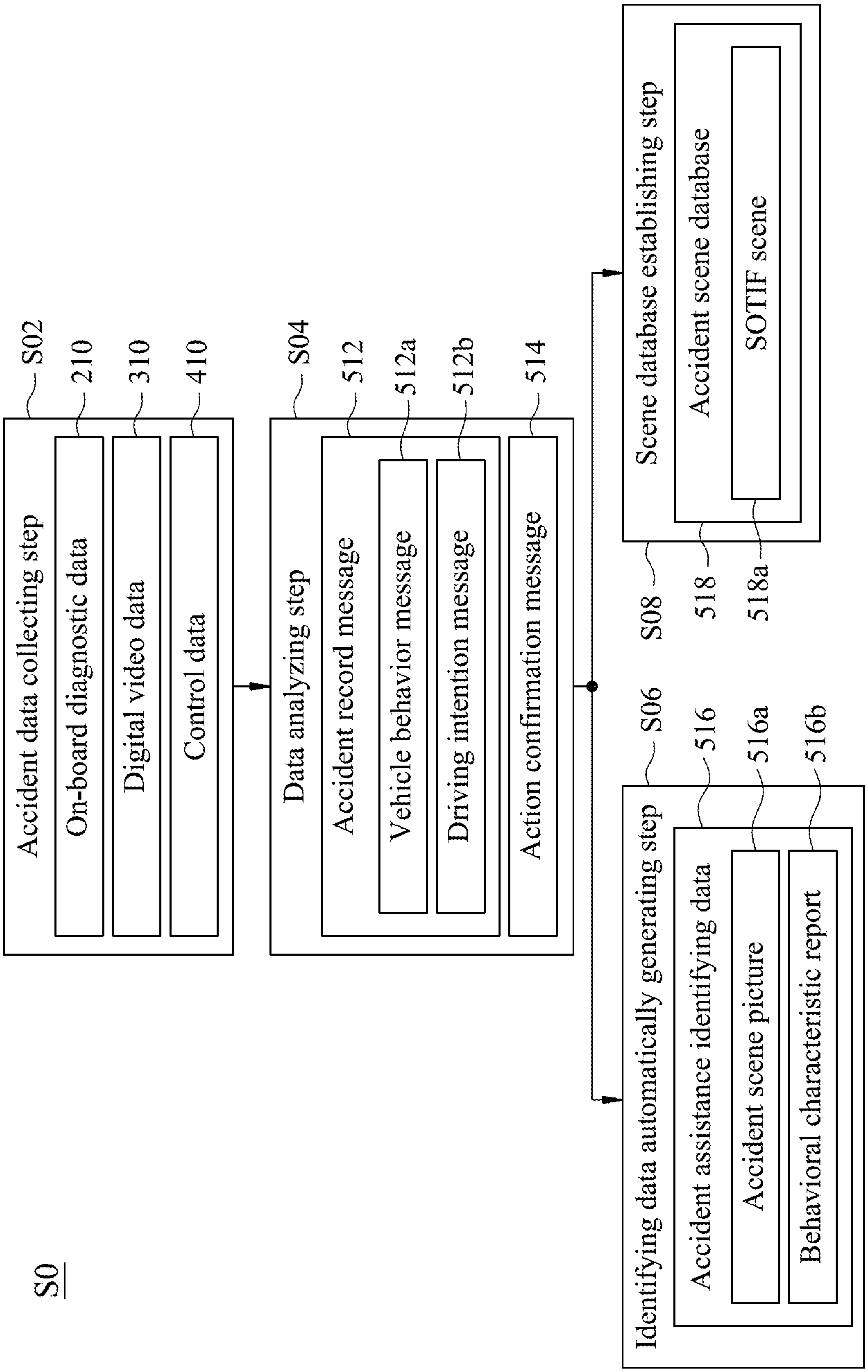
FIG. 2 shows a flow chart of a method of integrating a traffic accident assistance identification and a SOTIF scene establishment according to a second embodiment of the present disclosure.

Reference is made to FIGS. 1 and 2. FIG. 2 shows a flow chart of a method S0 of integrating a traffic accident assistance identification and a SOTIF scene establishment according to a second embodiment of the present disclosure. The method S0 of integrating the traffic accident assistance identification and the SOTIF scene establishment is applied to the vehicle 110 and includes performing an accident data collecting step S02, a data analyzing step S04, an identifying data automatically generating step S06 and a scene database establishing step S08. The accident data collecting step S02 includes configuring a cloud computing processing unit 510 to collect an on-board diagnostic data 210, a digital video data 310 and a control data 410 from an on-board diagnostic device 200, a digital video recorder 300 and a controller 400. The data analyzing step S04 includes configuring the cloud computing processing unit 510 to analyze the on-board diagnostic data 210, the digital video data 310 and the control data 410 to generate an accident record message 512 and an action confirmation message 514, and the accident record message 512 includes a vehicle behavior message 512*a* and a driving intention message 512*b*. The identifying data automatically generating step S06 includes configuring the cloud computing processing unit 510 to automatically generate an accident assistance identifying data 516 according to the vehicle behavior message 512*a*, the driving intention message 512*b* and the action confirmation message

514, and the accident assistance identifying data 516 includes an accident scene picture 516*a* and a behavioral characteristic report 516*b*. The scene database establishing step S08 includes configuring the cloud computing processing unit 510 to establish an accident scene database 518 according to the action confirmation message 514. The accident scene database 518 includes a SOTIF scene 518*a*.

Therefore, the system 100 and the method S0 of integrating the traffic accident assistance identification and the SOTIF scene establishment of the present disclosure not only can generate the accident assistance identifying data 516 effectively and quickly, and reduce labor cost, but also can clarify the main cause of the accident.

Figure 3:
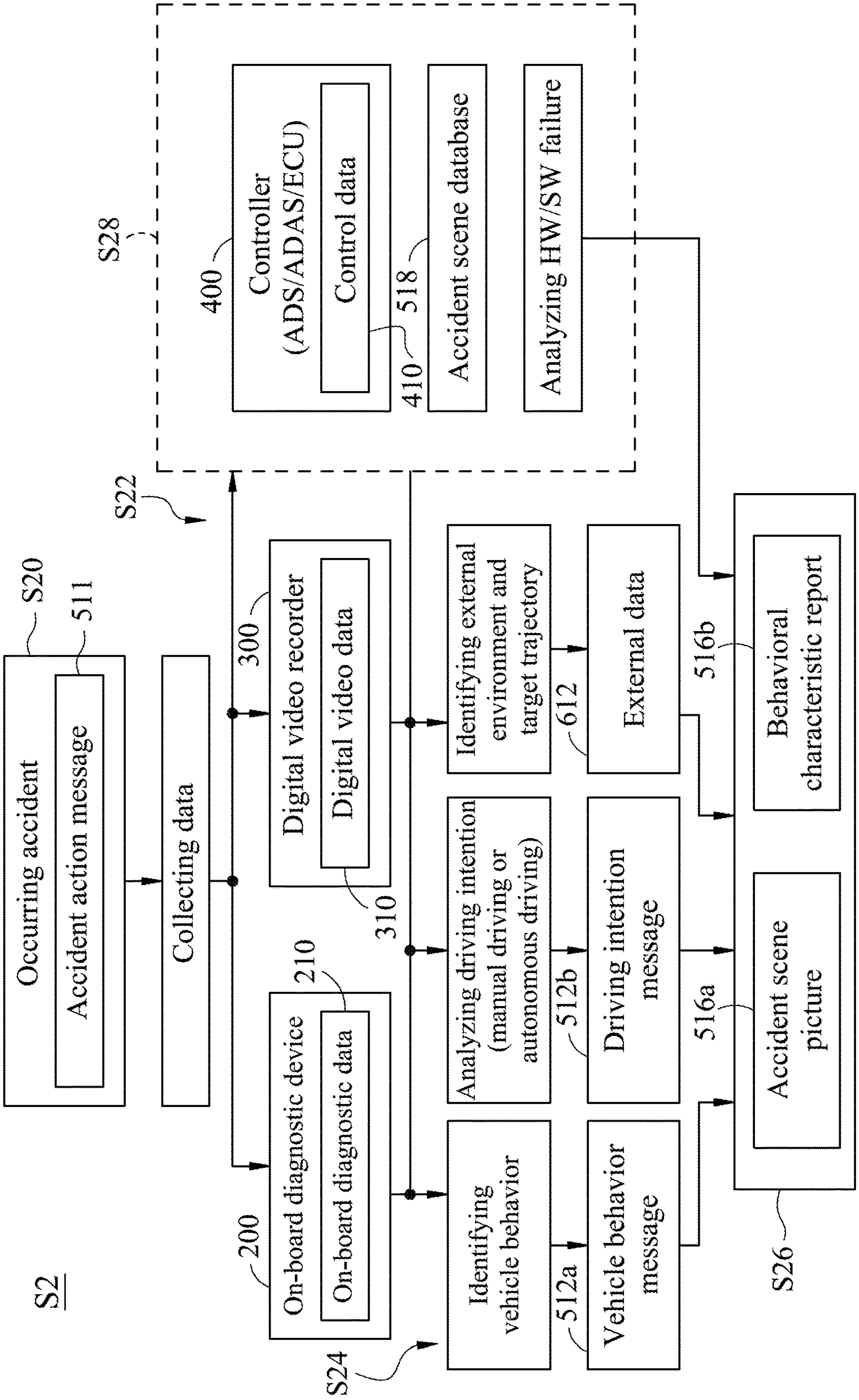
FIG. 3 shows a flow chart of a method of integrating a traffic accident assistance identification and a SOTIF scene establishment according to a third embodiment of the present disclosure.

Reference is made to FIGS. 1, 2 and 3. FIG. 3 shows a flow chart of a method S2 of integrating a traffic accident assistance identification and a SOTIF scene establishment according to a third embodiment of the present disclosure. The method S2 of integrating the traffic accident assistance identification and the SOTIF scene establishment is applied to the vehicle 110 and includes performing an accident judging step S20, an accident data collecting step S22, a data analyzing step S24, an identifying data automatically generating step S26 and a scene database establishing step S28.

The accident judging step S20 is "Occurring accident", and includes configuring the cloud computing processing unit 510 to receive an accident action message 511 of the vehicle 110 to generate an accident judgment result, and the accident judgment result represents that the vehicle 110 has an accident at an accident time. In one embodiment, the accident action message 511 includes at least one of an airbag operation message, an acceleration sensor sensing message and a sensor failure message. The airbag operation message represents a message generated by deployment of the airbag of the vehicle 110. The acceleration sensor sensing message represents a message generated by action of an acceleration sensor (G-sensor). The action represents that a sensing value of the acceleration sensor is greater than a predetermined value. The sensor failure message represents a message generated by the failure of the sensor, but the present disclosure is not limited thereto.

The accident data collecting step S22 is "Collecting data", and includes configuring the cloud computing processing unit 510 to collect an on-board diagnostic data 210, a digital video data 310 and a control data 410 from an on-board diagnostic device 200, a digital video recorder 300 and a controller 400. In detail, the cloud computing processing unit 510 collects the on-board diagnostic data 210 of the on-board diagnostic device 200, the digital video data 310 of the digital video recorder 300 and the control data 410 of the controller 400 when the vehicle 110 has an accident (i.e., the accident time). The on-board diagnostic data 210 includes at least one of a vehicle load, a rotational speed, a vehicle speed, a throttle position, an engine running time, a braking signal, a steering wheel angle, a tire pressure, a vehicle horn signal, a global positioning system (GPS) location and an emergency warning light signal. The digital video data 310 may have a frame rate (e.g., one frame per second). The controller 400 includes one of an autonomous driving system (ADS), an advanced driver assistance system (ADAS) and an electronic control unit (ECU). The control data 410 includes at least one of an electronic control unit voltage (i.e., ECU voltage), a state of charge (SOC), a lateral error, a longitudinal error, a LIDAR signal, a radar signal, a diagnostic signal, a steering wheel signal, an electric/throttle signal, an intervention event cause, an emergency button signal and a vehicle body signal.

The data analyzing step S24 includes configuring the cloud computing processing unit 510 to analyze the on-board diagnostic data 210, the digital video data 310 and the control data 410 to generate an accident record message 512 and an action confirmation message 514, and the accident record message 512 includes a vehicle behavior message 512*a* and a driving intention message 512*b*. In detail, the vehicle behavior message 512*a* includes at least one of a meandering behavior, an overspeeding behavior, a rapid acceleration and deceleration behavior and a red light running behavior. The driving intention message 512*b* includes one of a manual driving signal and an autonomous driving signal. For example, when the vehicle behavior message 512*a* is that the front of the vehicle 110 is swaying left and right (i.e., the meandering behavior), the on-board diagnostic data 210 is the steering wheel angle. When the vehicle behavior message 512*a* is a sudden increase or decrease of acceleration and deceleration (i.e., the rapid acceleration and deceleration behavior), the on-board diagnostic data 210 is the change of the throttle position, a fuel injection quantity signal, and the change of a throttle pedal signal and a brake signal. When the vehicle behavior message 512*a* is a steering behavior of the vehicle 110, the on-board diagnostic data 210 is an action signal of a turn lamp. In addition, the data analyzing step S24 may analyze the cause of each of scenes (Analyzing HW/SW failure) for subsequent judgment. "HW" represents a cause of hardware, and "SW" represents a cause of software.

The identifying data automatically generating step S26 includes configuring the cloud computing processing unit 510 to automatically generate an accident assistance identifying data 516 according to the vehicle behavior message 512*a*, the driving intention message 512*b* and the action confirmation message 514, and the accident assistance identifying data 516 includes an accident scene picture 516*a* and a behavioral characteristic report 516*b*. In detail, the accident scene picture 516*a* may include an accident time, an accident location and a summary message of on-site treatment. The behavioral characteristic report 516*b* may include an accident cause (a preliminary judgment form), an environmental condition at the accident time (weather, a sign), an accident history (assessment report) and an accident analysis. The accident analysis includes at least one of a driving behavior, a corroborating data, an ownership of right of way and a legal basis. Table 1 lists the relationship of message items, corresponding contents and hardware devices of the accident assistance identifying data 516. In Table 1, the accident time, the accident location and the summary message of on-site treatment of the accident assistance identifying data 516 are provided by the on-board diagnostic device 200 and the digital video recorder 300. The environmental condition at the accident time of the accident assistance identifying data 516 is provided by the digital video recorder 300. The accident cause, the accident history and the accident analysis of the accident assistance identifying data 516 are provided by the on-board diagnostic device 200, the digital video recorder 300 and the controller 400.

TABLE 1

| Message items | Corresponding contents | Hardware devices |
|---|---|---|
| Accident time, Accident location | Vehicle behavior, driving intention, external environment and target trajectory | OBD and DVR |
| Summary message of on-site treatment | Vehicle behavior, driving intention, external environment and target trajectory | OBD and DVR |
| Accident cause | Vehicle behavior, driving intention, external environment and controller action state | OBD, DVR and controller |
| Environmental condition at the accident time | External environment | DVR |
| Accident history | Vehicle behavior, driving intention, external environment and controller action state | OBD, DVR and controller |
| Accident analysis | Vehicle behavior, driving intention, external environment and controller action state | OBD, DVR and controller |

The scene database establishing step S28 includes configuring the cloud computing processing unit 510 to establish an accident scene database 518 according to the action confirmation message 514. The accident scene database 518 includes a SOTIF scene 518*a*. Therefore, the method S2 of integrating the traffic accident assistance identification and the SOTIF scene establishment can timely provide the real-time data of the vehicle 110 via the on-board diagnostic device 200, the digital video recorder 300, the controller 400, the roadside equipment 610 and the road sign 620 to perform a simple reconstruction of the accident when the accident occurs. The simple reconstruction of the accident focuses on a vehicle state, a driving intention and a weather condition at the accident time to clarify system failures, mechanical failures or false actions of human, and provides forensic personnel for evaluation. In addition, the present disclosure can assist the controller 400 (ADS/ADAS) to clarify the cause of the accident and collect the SOTIF scene 518*a* to provide strategies of technical improvement, thereby increasing the application level and improving the marketability. Accordingly, the present disclosure can solve the problem of conventional technique that is time-consuming production of manual appraisal reports, high labor cost, easy concealment and unclear main causes of the accident after the accident of the vehicle 110 occurs.

Figure 4:
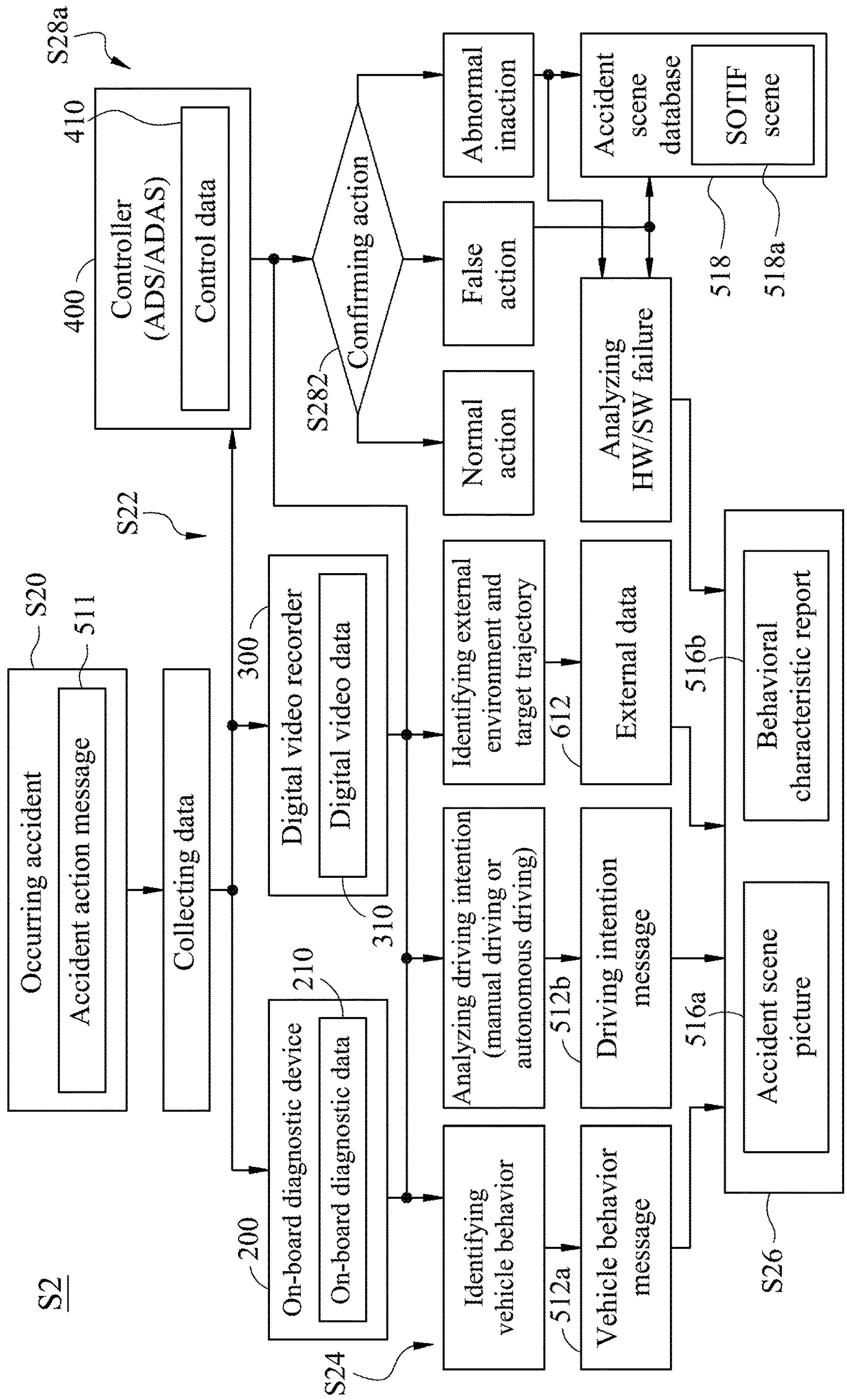
FIG. 4 shows a flow chart of a first example of the method of integrating the traffic accident assistance identification and the SOTIF scene establishment of FIG. 3.
Figure 5:
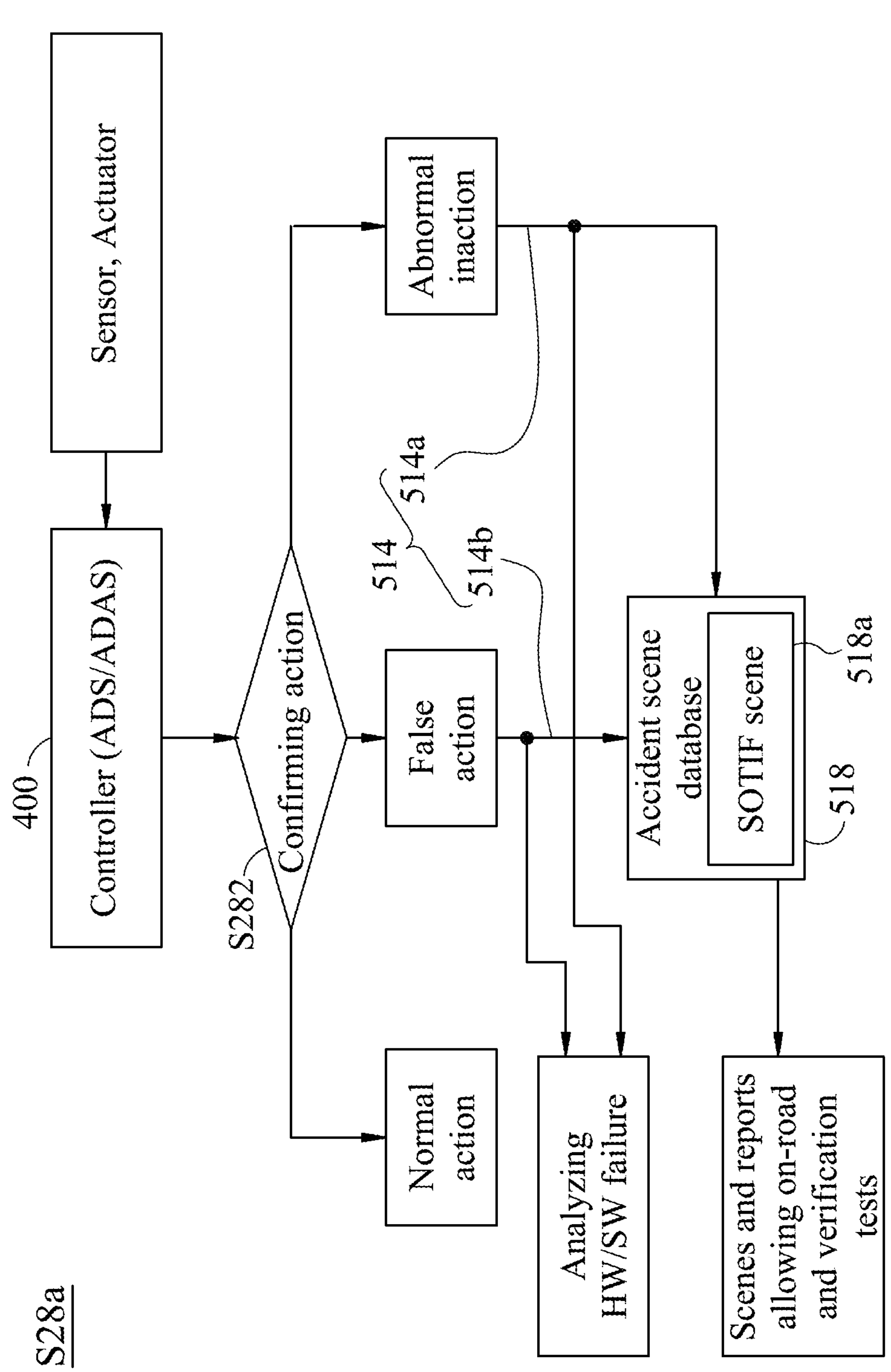
FIG. 5 shows a schematic view of action confirmation and a scene database establishing step of a controller of FIG. 4.

Reference is made to FIGS. 1, 2, 3, 4 and 5. FIG. 4 shows a flow chart of a first example of the method S2 of integrating the traffic accident assistance identification and the SOTIF scene establishment of FIG. 3. FIG. 5 shows a schematic view of action confirmation and a scene database establishing step S28*a* of a controller 400 (ADS/ADAS) of FIG. 4. The method S2 of integrating the traffic accident assistance identification and the SOTIF scene establishment includes performing an accident judging step S20, an accident data collecting step S22, a data analyzing step S24, an identifying data automatically generating step S26 and a scene database establishing step S28*a*. The scene database establishing step S28*a* is an embodiment of the scene database establishing step S28 in FIG. 3. The scene database establishing step S28*a* includes performing an action confirming step S282 and configuring the cloud computing processing unit 510 to establish the accident scene database 518 according to the action confirmation message 514. The accident scene database 518 includes the SOTIF scene 518*a*. The controller 400 is signally connected to a sensor and an actuator. In response to determining that the controller 400 includes one of the autonomous driving system (ADS) and the advanced driver assistance system (ADAS), the action confirmation message 514 includes an abnormal inaction data 514*a* and a false action data 514*b*. The abnormal inaction data 514*a* represents data generated by the controller 400 under a condition of the controller 400 that is supposed to act but actually not act (e.g., misjudgment of the sensor). The false action data 514*b* represents data generated by the controller 400 under another condition of the controller 400 that is not supposed to act but actually act (e.g., misjudgment of the actuator). The SOTIF scene 518*a* corresponds to one of the abnormal inaction data 514*a* and the false action data 514*b*. The action confirming step S282 is "Confirming action", and includes configuring the controller 400 to confirm whether the control data 410 belongs to the action confirmation message 514 to generate an action confirmation result. In response to determining that the action confirmation result is yes, the control data 410 represents an abnormal inaction or a false action, and the cloud computing processing unit 510 establishes the accident scene database 518 according to the action confirmation message 514. In response to determining that the action confirmation result is no, the control data 410 represents a normal action. It is also worth mentioning that the SOTIF scene 518*a* of the accident scene database 518 can be used for subsequent on-road and verification tests (scenes and reports allowing on-road and verification tests). In other words, the message of the SOTIF scene 518*a* can be transmitted to the manufacturer (manufacturing end) of the sensor, the actuator or the controller 400, so that the manufacturer can perform on-road and verification tests according to the message of the SOTIF scene 518*a*.

Figure 6:
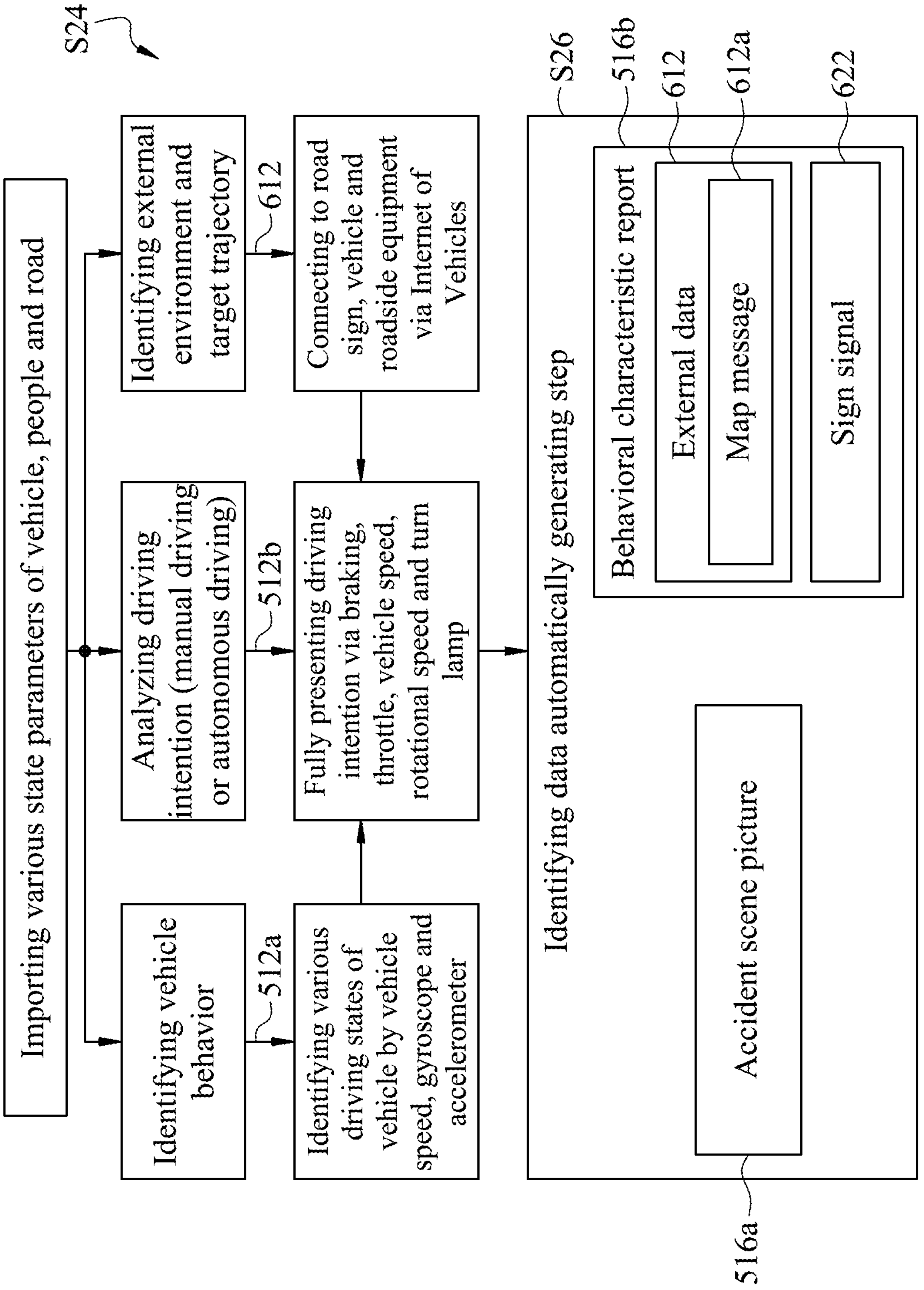
FIG. 6 shows a schematic view of a data analyzing step and an identifying data automatically generating step of FIG. 4.

Reference is made to FIGS. 1, 2, 3, 4 and 6. FIG. 6 shows a schematic view of a data analyzing step S24 and an identifying data automatically generating step S26 of FIG. 4. The data analyzing step S24 includes importing various state parameters of vehicle (i.e., the vehicle 110), people and road; identifying vehicle behavior, i.e., identifying various driving states of the vehicle 110 by the vehicle speed, a gyroscope and an accelerometer; analyzing driving intention, i.e., fully presenting driving intention via the braking, the throttle, the vehicle speed, the rotational speed and the turn lamp; identifying external environment and target trajectory, i.e., connecting to the road sign 620, the vehicle 110 and the roadside equipment 610 via Internet of Vehicles (e.g., V2X or V2V) so as to obtain the external data 612. The target trajectory represents a driving trajectory of a target other than the vehicle 110 (e.g., another vehicle at the accident time) during the accident history. The target trajectory can be obtained by the digital video recorder 300 or the roadside equipment 610. In addition, the accident scene picture 516*a* of the identifying data automatically generating step S26 is a restoration image of dynamic collision trajectory, and the accident scene picture 516*a* can provide the accident history of the vehicle 110 before and after the collision per second for 1 minute (i.e., provide dynamic driving trajectory of the vehicle 110 and the accident history before and after the collision). The time period before and after the collision (i.e., 1 minute) and the sampling time interval (i.e., per second) may be adjusted according to need. The behavioral characteristic report 516*b* includes the external data 612 and the sign signal 622. The external data 612 includes a map message 612*a*. The external data 612 is generated by the roadside equipment 610 detecting the road. The sign signal 622 is generated by the road sign 620. Therefore, the data analyzing step S24 and the identifying data automatically generating step S26 of the present disclosure can automatically generate an accident collision type, the accident time, vehicle types, etc. according to the imported parameters, and can combine with the map message 612_a_ (such as Google Map) to utilize a geographic information system (GIS) to analyze location.

Figure 7:
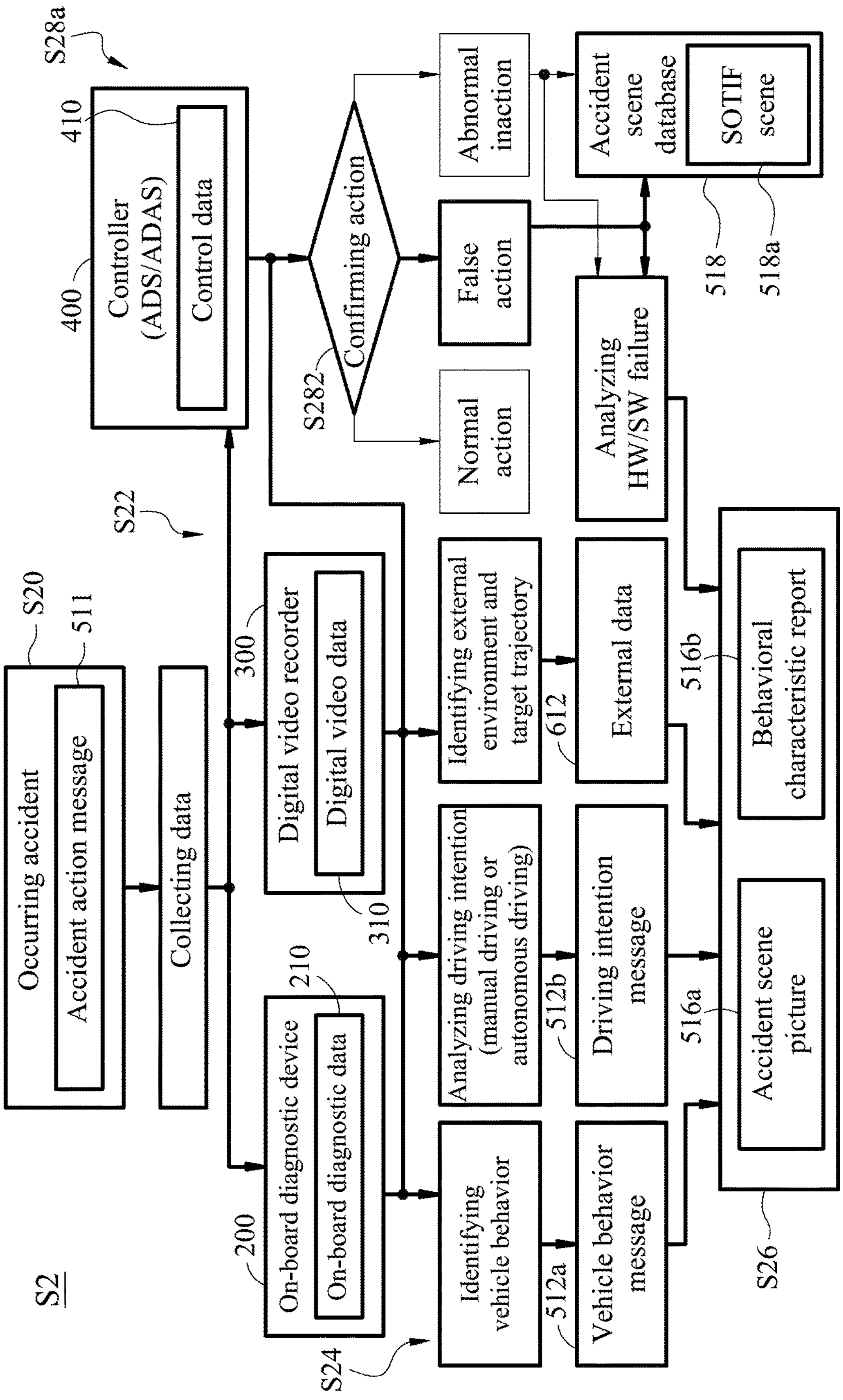
FIG. 7 shows a flow chart of the method of integrating the traffic accident assistance identification and the SOTIF scene establishment of FIG. 4 applied to an accident state.

Reference is made to FIGS. 1, 2, 3, 4, 5, 6 and 7. FIG. 7 shows a flow chart of the method S2 of integrating the traffic accident assistance identification and the SOTIF scene establishment of FIG. 4 applied to an accident state. In the accident state, a first vehicle (a front vehicle) and a second vehicle (a rear vehicle) are traveling on the road. The first vehicle is equipped with an autonomous emergency braking (AEB) system, i.e., the controller 400 of the first vehicle includes the ADAS. The distance between the first vehicle and the second vehicle is maintained within a safety range. There is a traffic accident in which the first vehicle collides with the second vehicle due to a false action of the AEB system of the first vehicle (e.g., there is no obstacle in front of the first vehicle, but the ADAS of the first vehicle brakes sharply). According to the above-mentioned accident state, the method S2 of integrating the traffic accident assistance identification and the SOTIF scene establishment of the present disclosure can obtain the accident history via the on-board diagnostic device 200, the digital video recorder 300 and the controller 400. The accident history includes: the first vehicle is equipped with the AEB system, and the AEB system is turned on; the external environment (weather) is sunny without backlight; the road is smooth, and the speed limit is 70 kmph; there is no red light running, and there is no obstacle in front of the first vehicle; the first vehicle brakes sharply; and according to the control data 410, it is known that the AEB system does have a start-up message. Hence, the AEB system is judged as the false action (misjudgment of the actuator), the false action is synchronously collected as the SOTIF scene 518_a_, as shown by the thick frame and the thick line in FIG. 7. In the aspect of accident responsibility clarification, because the front vehicle brakes sharply, the front vehicle shares 70% of the responsibility, and the rear vehicle shares 30% of the responsibility. Therefore, the real cause of the accident can be clarified by the method S2 of integrating the traffic accident assistance identification and the SOTIF scene establishment of the present disclosure, and the rear vehicle can share less responsibility (the rear vehicle originally shares 100% of the responsibility).

Figure 8:
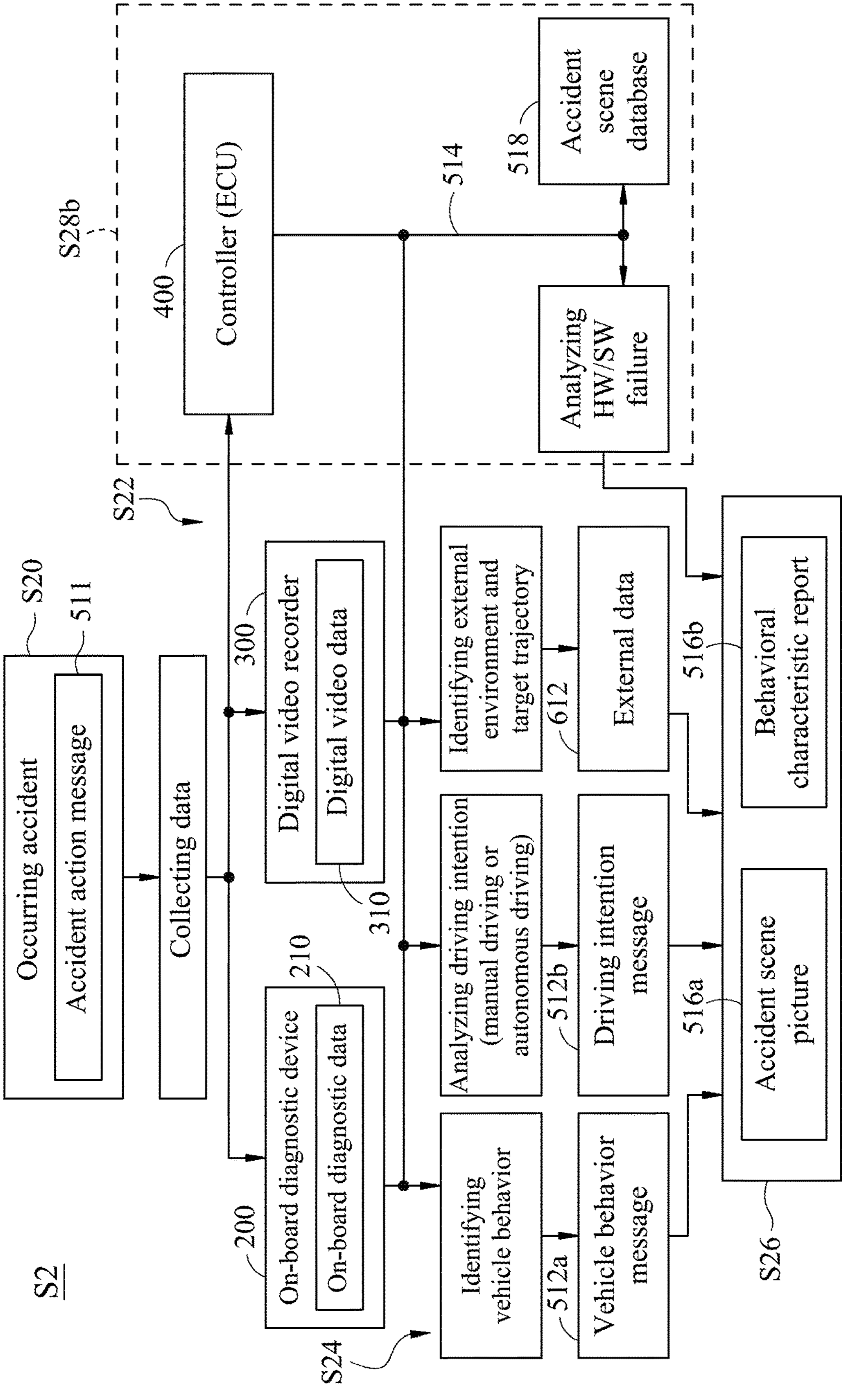
FIG. 8 shows a flow chart of a second example of the method of integrating the traffic accident assistance identification and the SOTIF scene establishment of FIG. 3.

Reference is made to FIGS. 1, 2, 3 and 8. FIG. 8 shows a flow chart of a second example of the method S2 of integrating the traffic accident assistance identification and the SOTIF scene establishment of FIG. 3. The method S2 of integrating the traffic accident assistance identification and the SOTIF scene establishment includes performing an accident judging step S20, an accident data collecting step S22, a data analyzing step S24, an identifying data automatically generating step S26 and a scene database establishing step S28_b_. The scene database establishing step S28_b_ is another embodiment of the scene database establishing step S28 in FIG. 3. The scene database establishing step S28_b_ includes configuring the cloud computing processing unit 510 to establish the accident scene database 518 according to the action confirmation message 514. In response to determining that the controller 400 includes the electronic control unit (ECU), the action confirmation message 514 includes the on-board diagnostic data 210 generated by the on-board diagnostic device 200, the digital video data 310 generated by the digital video recorder 300, and the control data 410 generated by the ECU. Therefore, the present disclosure can record the scene of the vehicle 110 at the accident time and automatically generate the accident assistance identifying data 516 as the basis for the accident analysis via the ECU of the controller 400 combined with the on-board diagnostic device 200 and the digital video recorder 300.

It is understood that the methods S0, S2 of integrating the traffic accident assistance identification and the SOTIF scene establishment of the present disclosure are performed by the aforementioned steps. A computer program of the present disclosure stored on a non-transitory tangible computer readable recording medium is used to perform the methods S0, S2 described above. The aforementioned embodiments can be provided as a computer program product, which may include a machine-readable medium on which instructions are stored for programming a computer (or other electronic devices) to perform a process based on the embodiments of the present disclosure. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, or another type of media/machine-readable medium suitable for storing electronic instructions. Moreover, the embodiments of the present disclosure also can be downloaded as a computer program product, which may be transferred from a remote computer to a requesting computer by using data signals via a communication link (such as a network connection or the like).

According to the aforementioned embodiments and examples, the advantages of the present disclosure are described as follows.

1. The system and the method of integrating the traffic accident assistance identification and the SOTIF scene establishment of the present disclosure can timely provide the real-time data of the vehicle via the on-board diagnostic device, the digital video recorder, the controller, the roadside equipment and the road sign to perform a simple reconstruction of the accident when the accident occurs. The simple reconstruction of the accident focuses on a vehicle state, a driving intention and a weather condition at the accident time to clarify system failures, mechanical failures or false actions of human, and provides forensic personnel for evaluation.

2. The system and the method of integrating the traffic accident assistance identification and the SOTIF scene establishment of the present disclosure can assist the controller (ADS/ADAS) to clarify the cause of the accident and collect the SOTIF scene to provide strategies of technical improvement, thereby increasing the application level and improving the marketability. Moreover, the present disclosure can solve the problem of conventional technique that is time-consuming production of manual appraisal reports, high labor cost, easy concealment and unclear main causes of the accident after the accident of the vehicle occurs.

3. The system and the method of integrating the traffic accident assistance identification and the SOTIF scene establishment of the present disclosure can record driving history messages in detail via equipment on the vehicle, thereby not only clarifying the responsibility for the accident, simplifying the procedure for collecting evidence and reducing labor cost, but also providing the action state of the vehicle in the accident for the competent authorities and the vehicle manufacturer as reference.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A system of integrating a traffic accident assistance identification and a safety of an intended functionality scene establishment, which is applied to a vehicle, and the system of integrating the traffic accident assistance identification and the safety of the intended functionality (SOTIF) scene establishment comprising:

an on-board diagnostic (OBD) device disposed on the vehicle and capturing an on-board diagnostic data;

a digital video recorder (DVR) disposed on the vehicle and capturing a digital video data;

a controller disposed on the vehicle and generating a control data; and a cloud computing processing unit signally connected to the on-board diagnostic device, the digital video recorder and the controller, wherein the cloud computing processing unit is configured to perform steps comprising:

performing an accident data collecting step, wherein the accident data collecting step comprises configuring the cloud computing processing unit to collect the on-board diagnostic data, the digital video data and the control data from the on-board diagnostic device, the digital video recorder and the controller;

performing a data analyzing step, wherein the data analyzing step comprises configuring the cloud computing processing unit to analyze the on-board diagnostic data, the digital video data and the control data to generate an accident record message and an action confirmation message, and the accident record message comprises a vehicle behavior message and a driving intention message;

performing an identifying data automatically generating step, wherein the identifying data automatically generating step comprises configuring the cloud computing processing unit to automatically generate an accident assistance identifying data according to the vehicle behavior message, the driving intention message and the action confirmation message, and the accident assistance identifying data comprises an accident scene picture and a behavioral characteristic report; and performing a scene database establishing step, wherein the scene database establishing step comprises configuring the cloud computing processing unit to establish an accident scene database according to the action confirmation message;

wherein the accident scene database comprises a SOTIF scene, and the controller comprises one of an autonomous driving system (ADS), an advanced driver assistance system (ADAS) and an electronic control unit (ECU).

2. The system of integrating the traffic accident assistance identification and the SOTIF scene establishment of claim 1, wherein the cloud computing processing unit is configured to perform the steps, further comprising:

performing an accident judging step, wherein the accident judging step comprises configuring the cloud computing processing unit to receive an accident action message of the vehicle to generate an accident judgment result, and the accident judgment result represents that the vehicle has an accident at an accident time.

3. The system of integrating the traffic accident assistance identification and the SOTIF scene establishment of claim 2, wherein the accident action message comprises at least one of an airbag operation message, an acceleration sensor sensing message and a sensor failure message.

4. The system of integrating the traffic accident assistance identification and the SOTIF scene establishment of claim 1, wherein in response to determining that the controller comprises one of the autonomous driving system and the advanced driver assistance system, the action confirmation message comprises:

an abnormal inaction data representing data generated by the controller under a condition of the controller that is supposed to act but actually not act; and a false action data representing data generated by the controller under another condition of the controller that is not supposed to act but actually act;

wherein the SOTIF scene corresponds to one of the abnormal inaction data and the false action data.

5. The system of integrating the traffic accident assistance identification and the SOTIF scene establishment of claim 1, wherein, the on-board diagnostic data comprises at least one of a vehicle load, a rotational speed, a vehicle speed, a throttle position, an engine running time, a braking signal, a steering wheel angle, a tire pressure, a vehicle horn signal, a global positioning system (GPS) location and an emergency warning light signal; and the control data comprises at least one of an electronic control unit voltage, a state of charge (SOC), a lateral error, a longitudinal error, a LIDAR signal, a radar signal, a diagnostic signal, a steering wheel signal, an electric/throttle signal, an intervention event cause, an emergency button signal and a vehicle body signal.

6. The system of integrating the traffic accident assistance identification and the SOTIF scene establishment of claim 1, wherein, the vehicle behavior message comprises at least one of a meandering behavior, an overspeeding behavior, a rapid acceleration and deceleration behavior and a red light running behavior; and the driving intention message comprises one of a manual driving signal and an autonomous driving signal.

7. The system of integrating the traffic accident assistance identification and the SOTIF scene establishment of claim 1, wherein, the accident scene picture comprises an accident time, an accident location and a summary message of on-site treatment; and the behavioral characteristic report comprises an accident cause, an environmental condition at the accident time, an accident history and an accident analysis, and the accident analysis comprises at least one of a driving behavior, a corroborating data, an ownership of right of way and a legal basis;

wherein the accident time, the accident location and the summary message of on-site treatment are provided by the on-board diagnostic device and the digital video recorder, the environmental condition at the accident time are provided by the digital video recorder, and the accident cause, the accident history and the accident analysis are provided by the on-board diagnostic device, the digital video recorder and the controller.

8. The system of integrating the traffic accident assistance identification and the SOTIF scene establishment of claim 1, further comprising:

a roadside equipment signally connected to the cloud computing processing unit, wherein the roadside equipment is disposed on a road and detects the road to generate an external data; and a road sign signally connected to the cloud computing processing unit, wherein the road sign is disposed on the road and generates a sign signal;

wherein the external data comprises a map message, and the behavioral characteristic report comprises the external data and the sign signal.

9. A method of integrating a traffic accident assistance identification and a safety of an intended functionality scene establishment, which is applied to a vehicle, and the method of integrating the traffic accident assistance identification and the safety of the intended functionality (SOTIF) scene establishment comprising:

performing an accident data collecting step, wherein the accident data collecting step comprises configuring a cloud computing processing unit to collect an on-board diagnostic data, a digital video data and a control data from an on-board diagnostic (OBD) device, a digital video recorder (DVR) and a controller;

performing a data analyzing step, wherein the data analyzing step comprises configuring the cloud computing processing unit to analyze the on-board diagnostic data, the digital video data and the control data to generate an accident record message and an action confirmation message, and the accident record message comprises a vehicle behavior message and a driving intention message;

performing an identifying data automatically generating step, wherein the identifying data automatically generating step comprises configuring the cloud computing processing unit to automatically generate an accident assistance identifying data according to the vehicle behavior message, the driving intention message and the action confirmation message, and the accident assistance identifying data comprises an accident scene picture and a behavioral characteristic report; and performing a scene database establishing step, wherein the scene database establishing step comprises configuring the cloud computing processing unit to establish an accident scene database according to the action confirmation message;

wherein the accident scene database comprises a SOTIF scene, and the controller comprises one of an autonomous driving system (ADS), an advanced driver assistance system (ADAS) and an electronic control unit (ECU).

10. The method of integrating the traffic accident assistance identification and the SOTIF scene establishment of claim 9, further comprising:

performing an accident judging step, wherein the accident judging step comprises configuring the cloud computing processing unit to receive an accident action message of the vehicle to generate an accident judgment result, and the accident judgment result represents that the vehicle has an accident at an accident time.

11. The method of integrating the traffic accident assistance identification and the SOTIF scene establishment of claim 10, wherein the accident action message comprises at least one of an airbag operation message, an acceleration sensor sensing message and a sensor failure message.

12. The method of integrating the traffic accident assistance identification and the SOTIF scene establishment of claim 9, wherein in response to determining that the controller comprises one of the autonomous driving system and the advanced driver assistance system, the action confirmation message comprises:

an abnormal inaction data representing data generated by the controller under a condition of the controller that is supposed to act but actually not act; and a false action data representing data generated by the controller under another condition of the controller that is not supposed to act but actually act;

wherein the SOTIF scene corresponds to one of the abnormal inaction data and the false action data.

13. The method of integrating the traffic accident assistance identification and the SOTIF scene establishment of claim 9, wherein, the on-board diagnostic data comprises at least one of a vehicle load, a rotational speed, a vehicle speed, a throttle position, an engine running time, a braking signal, a steering wheel angle, a tire pressure, a vehicle horn signal, a global positioning system (GPS) location and an emergency warning light signal; and the control data comprises at least one of an electronic control unit voltage, a state of charge (SOC), a lateral error, a longitudinal error, a LIDAR signal, a radar signal, a diagnostic signal, a steering wheel signal, an electric/throttle signal, an intervention event cause, an emergency button signal and a vehicle body signal.

14. The method of integrating the traffic accident assistance identification and the SOTIF scene establishment of claim 9, wherein, the vehicle behavior message comprises at least one of a meandering behavior, an overspeeding behavior, a rapid acceleration and deceleration behavior and a red light running behavior; and the driving intention message comprises one of a manual driving signal and an autonomous driving signal.

15. The method of integrating the traffic accident assistance identification and the SOTIF scene establishment of claim 9, wherein, the accident scene picture comprises an accident time, an accident location and a summary message of on-site treatment; and the behavioral characteristic report comprises an accident cause, an environmental condition at the accident time, an accident history and an accident analysis, and the accident analysis comprises at least one of a driving behavior, a corroborating data, an ownership of right of way and a legal basis;

wherein the accident time, the accident location and the summary message of on-site treatment are provided by the on-board diagnostic device and the digital video recorder, the environmental condition at the accident time are provided by the digital video recorder, and the accident cause, the accident history and the accident analysis are provided by the on-board diagnostic device, the digital video recorder and the controller.

16. The method of integrating the traffic accident assistance identification and the SOTIF scene establishment of claim 9, wherein the behavioral characteristic report comprises:

an external data comprising a map message, wherein the external data is generated by a roadside equipment detecting a road; and a sign signal generated by a road sign.

* * * * *